United States Patent Office 3,371,124
Patented Feb. 27, 1968

3,371,124
INHIBITING POPCORN POLYMER FORMATION
Harry Elmer Albert, Lafayette Hill, and Alfred Case Whiton, Blue Bell, Pa., assignors to Pennsalt Chemicals Corporation, Philadelphia, Pa., a corporation of Pennsylvania
No Drawing. Filed Apr. 26, 1965, Ser. No. 451,042
7 Claims. (Cl. 260—666.5)

ABSTRACT OF THE DISCLOSURE

Inhibition of the undesirable polymerization of olefinic monomers which give rise to popcorn polymers by the use of a mixture of N,N-dialkylhydroxylamine and its bis-oxalate salt as a popcorn polymer inhibitor in processes relating to the preparation of synthetic rubber.

In the preparation of synthetic rubber from such intermediates as styrene and butadiene (e.g. SBR elastomers) undesirable spontaneous polymerization often occurs in the recovery systems for the olefinically unsaturated monomers. Polymerization may occur to form either a clear, solid, aromatic solvent-soluble polymer or to form an entirely different cross-linked insoluble polymer, known, because of its appearance, as popcorn polymer. While both types of this self-polymerization are objectionable, the popcorn polymer, which is predominantly formed, is particularly undesirable because it is self-propagating in the presence of the monomer vapor or liquid and not only rapidly fouls the equipment, but is very difficult to remove and control. When such popcorn polymers do form it frequently becomes necessary to disassemble the equipment and mechanically remove the accumulations of unwanted polymer.

Much work has been done to find suitable inhibitors to prevent popcorn polymer formation. Nitrites and nitroso compounds have been found to be effective as have $NO_2$, $N_2O_3$, certain phenolic compounds, sulfur and some aromatic amines. However, each of these agents leaves something to be desired for commercially effective use. Some of the agents are difficult to handle; others introduce colored impurities into the recovered olefins; some, although having the desired properties, are too expensive to be of commercial utility. One of the major objections to previously used popcorn polymer inhibitors is their ineffectiveness in the presence of seed; that is, where clean equipment is used, the prior art inhibitors may reduce the tendency for popcorn polymer to form, but once a popcorn polymer seed is formed the inhibitors lose effectiveness. As will be seen, this invention provides popcorn polymer inhibitors which retain their inhibiting properties even when popcorn polymer seed is in the system.

Because of the uniqueness of the popcorn polymer and the manner in which it is formed, there is no correlation between popcorn polymer inhibition and monomer stabilizers useful to prevent the premature polymerization of olefins during shipping and storage. Thus, although hydroxylamine hydrochloride has been reported in U.S. 2,318,211 to be useful for stabilizing styrene against premature polymerization, the use of hydroxylamine or its salts as a popcorn polymer inhibitor is fraught with difficulties and cannot effectively be used in commercial processes. For example, hydroxylamine is not stable as its free base and is thus difficult to store and use. Since it decomposes to a large extent in several hours it must continually be added to maintain an effective concentration. Furthermore, the salt is not volatile and the free base is unstable and therefore, neither can be evenly distributed throughout the gaseous recovery system where the popcorn polymer forms. Still another disadvantage with hydroxylamine salts is their insolubility in the monomers and thus they require physical contact which makes for inefficient inhibition properties. It is probably because of these factors that hydroxylamine salts function so poorly as popcorn polymer inhibitors. Likewise, numerous other agents reported to be stabilizers for olefinic monomers are not effective as popcorn polymer inhibitors. For example, vapor phase evaluation for popcorn polymer inhibition of numerous monomer stabilizers indicated that they were either ineffective or only very slightly more effective than a control test in which they were not present. Thus it is clear that the finding of an improved popcorn polymer inhibitor adaptable for use in the recovery systems of elastomer manufacturing processes, especially the finding of one soluble in the hydrocarbon monomers employed, is a significant advance in the art. Very recently a signficant improvement in the art has been made by providing as popcorn polymer inhibitors, N,N-dialkylhydroxylamines and this development is disclosed and claimed in U.S. 3,148,225.

It has now been found by means of this invention that extremely effective inhibition of popcorn polymer formation can be achieved by the use of a synergistic mixture comprising an N,N-dialkylhydroxylamine which corresponds to the chemical formula

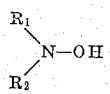

where $R_1$ is lower alkyl and $R_2$ is lower alkyl, and a bis-oxalate salt of said N,N-dialkylhydroxylamine. By lower alkyl group is meant such groups as methyl, ethyl, propyl, isopropyl, butyl, isobutyl and amyl and the term alkyl is meant to include cycloalkyl such as cyclohexyl. The R groups, it will be understood, may be the same or different. Likewise, in the practice of this invention the bis-oxalate salt may be used in admixture with an N,N-dialkylhydroxylamine in which the alkyl groups are the same or different from those of the bis-N,N-dialkylhydroxylamine oxalate.

As already indicated, in the manufacture of synthetic rubber the problem of popcorn polymer formation is peculiar to the monomer recovery system where the monomers are recovered by distillation. The conventional closed system for the emulsion polymerization of butadiene with styrene comprises a conventional reaction vessel equipped with a stirring mechanism and necessary heating or cooling means in which the monomers are caused to polymerize. After a suitable degree of polymerization is achieved, the polymerization reaction is stopped by the addition of a suitable short stopping agent. The resulting polymer latex is then allowed to flow into a flash tank which is at or slightly above atmospheric pressure and at which time most of the residual butadiene is removed from the latex. The gaseous butadiene is then removed from the flash tank and liquified for reuse. The butadiene degassed latex is then allowed to flow into a conventional vacuum flash tank where further butadiene and other dissolved gaseous materials are removed. The vacuum flash tank is maintained at a temperature of about 100° F. It is in this vacuum flash tank that the most ideal conditions for popcorn polymer formation exist because the tank is at the proper temerature; the atmosphere above the level of latex contained in the tank contains about 2% or less of butadiene; and a certain amount of catalyst has vaporized and collected on the inner exposed metal surfaces of the tank above the level of the latex. These conditions will initiate popcorn polymer. The popcorn polymer will continue to grow as long as it is fed by a new supply of latex containing a small proportion of butadiene and other polymerizable monomer, such as styrene. The pipe lines leading to and from this vacuum flash tank are also ideal areas for popcorn polymer formation.

The latex is then pumped from the vacuum flash tank to a conventional styrene stripping column where the latex is passed counter-current to a rising stream of steam causing the styrene to be removed from the latex where it is then recirculated in a conventional manner to the reaction vessel for polymerization with butadiene. In the styrene column popcorn polymer formation also tends to develop unless some precautions are taken to prevent its development.

Preferably, the inhibitor is added to a flash tank used in the process. However, the inhibitor may be introduced to the monomer at any stage in the manufacture of synthetic rubber, as for example during the manufacture, handling, storage, etc. of the intermediates. For example, the inhibitor vapor can be introduced as the gaseous monomer is being passed through pipes, it can be mixed with the monomer in process tanks, or, as indicated, it can be introduced during the fractional distillation of materials in the recovery systems of the rubber manufacturing process. In the preferred technique it is considered best to feed the monomer into a flash tank or fractional distillation column of conventional type. The monomer is subject to fractional distillation using conventional reboiling at the bottom of the column and withdrawal of overhead material at the top, condensing the overhead material and returning a portion of it to the top of the column as reflux. The inhibiting vapor or solution is continuously fed, preferably by spraying its solution in water or monomer into the upper portion of the column through which it descends. In other techniques the inhibitor can be introduced to one or more of the monomers in any phase wherein the monomer is being circulated in the process.

The effective concentration at which the inhibitor mixture is used will usually range from 0.001 to about 5.0 percent by weight of the total monomers (i.e. about 10.0 to 50,000 parts per million parts of monomers). At concentrations below this value the inhibiting effects are too small to be of significant value. On the other hand, greater amounts may be used, say up to 20%, but such large amounts are not required and are simply wasteful.

The bis oxalates used in the invention are readily obtained from essentially stoichiometric amounts of the alkylhydroxylamine and oxalic acid which is a low cost commercial material. They are stable white crystalline solids readily soluble in water. For example, bis(diethylhydroxylamine) oxalate is a stable white crystalline solid melting at 137–140° C. [A. C. Cope, T. T. Foster and P. H. Towle, J. Am. Chem. Soc. 71, 3929 (1949)]. Thus the use of a bis oxalate in combination with an alkylhydroxylamine not only provides a better method for effective popcorn polymer inhibition, but also permits lower costs as compared to the use of the alkylhydroxylamine alone. It will be understood that mixtures may be made by merely mixing the bis-oxalate salt with the free base hydroxylamine, or, the mixtures may be made in situ by the addition of the appropriate amount of oxalic acid to an aqueous solution of the free base. The ratio of free base alkylhydroxylamine to the oxalate salt will vary over a wide range. Weight ratios of from 90:10 to 10:90 of free base to oxalate salt have been found satisfactory. The preferred ratio, however, will be from 25:75 to 75:25.

It is to be understood that the mixture of alkylhydroxylamine and its bis-oxalate may be used generally to prevent popcorn polymers in the preparation of polymers and copolymers such as those obtained from ethylenically unsaturated monomers. For homopolymers, the unsaturated monomer will be a conjugated diolefin. The useful conjugated diolefins are exemplified by butadienes such as butadiene-1,3, isoprene, cyanobutadiene-1,3, chloroprene, 2-phenylbutadiene, 2,3-dimethylbutadiene-1,3, and the like. The copolymerizable monomer used in copolymer formation and which will normally comprise up to about 70% of the mixture will be a mono-olefin containing a single $CH_2=CH-$ group having at least one of the free valence bonds attached to an electronegative group. Such olefins include aromatic olefins such as styrene, vinylnaphthalene, $\alpha$-methylstyrene, p-chlorostyrene, etc.; the carboxy containing monomers and the corresponding esters, nitriles, and amides such as acrylic acid, methacrylic acid, methyl methacrylate, acrylonitrile, methacrylamide, and the like. Preferably, this invention will be used in recovering the monomers used to make any butadiene-based polymer latex.

In order to illustrate the effectiveness of the invention, the following examples are given:

EXAMPLE 1

The technique used for evaluating a compound as an inhibitor for popcorn polymer in the liquid phase involved flushing 7 oz. between bottles with nitrogen, then charging each bottle with 30 ml. of inhibitor-free styrene, 0.5 g. of popcorn polymer "seed" and the material to be tested as the popcorn inhibitor. In order to make the test more severe the "seed" was activated just before usage by overnight exposure to a 100 watt incandescent lamp. The bottles were capped and 1 ml. of liquid butadiene was injected into each bottle with a hypodermic syringe through the self-sealing synthetic rubber cap liner. The bottles were then placed in a constant temperature oven at 140° F. and were inspected periodically for the appearance of popcorn polymer. After popcorn growth started in each bottle it usually proceeded rapidly, filling the free space in the bottle nearly full within hours with white, insoluble polymer having the appearance of popcorn.

In evaluating the effectiveness of a given inhibitor in the vapor phase, a procedure was followed which was similar to that used for the liquid phase test, the only difference being that the activated popcorn "seed" was suspended in the vapor phase above the liquid phase in the bottles instead of adding it to the liquid phase in the bottom of the bottles. The "seed" was contained in a small cylindrical stainless steel wire mesh basket, held in place in the vapor space with a thin stainless steel wire that passed through the cap liner. The bottles were heated at 140° F. in a constant temperature oven and the rate of growth of popcorn polymer was periodically observed.

The data obtained is illustrated by the following tables:

Table I

| Liquid Phase—Activated Seed Test | Result on Oven Heating at 140° F. |
| --- | --- |
| Compound: | |
| 0.05% Diethylhydroxylamine | Popped after 1½ days. |
| 0.10% Diethylhydroxylamine | Popped after 2½ days. |
| 0.05% Diethylhydroxylamine plus 0.05% Bis (diethylhydroxylamine) oxalate. | Popped after 13 days. |
| No inhibitor | Popped after 12 hours. |

Table II

| Vapor Phase—Activated Seed Test | Result on Oven Heating at 140° F. |
| --- | --- |
| Compound: | |
| 0.05% Diethylhydroxylamine | Large amount of popcorn in both vapor and liquid phases in 6 days. |
| 0.10% Diethylhydroxylamine | Moderate amount of popcorn in vapor in 6 days; liquid phase glassy solid in this time. |
| 0.05% Diethylhydroxylamine plus 0.05% Bis (diethylhydroxylamine) oxalate. | No popcorn in vapor in 13 days; liquid phase part popcorn, part glassy solid in this time. |
| No inhibitor | Very large amount of popcorn in vapor in 2 days; liquid phase completely popped in 3 days. |

EXAMPLE 2

Instead of using N,N-diethylhydroxylamine in Example 1, the following mixtures may be used to practice the invention:

| Free base: | Bisoxalate salt |
|---|---|
| N,N-dimethylhydroxylamine | N,N-dimethylhydroxylamine. |
| N,N-diethylhydroxylamine | N,N-dimethylhydroxylamine. |
| N,N-di-isopropylhydroxylamine | N,N-diethylhydroxylamine. |
| N,N-di-n-butylhydroxylamine | N,N-diethylhydroxylamine. |
| N,N-dicyclohexylhydroxylamine | N,N-dicyclohexylhydroxylamine. |
| N-methyl-N-ethylhydroxylamine | N,N-diethylhydroxylamine. |
| N-cyclohexylhydroxylamine | N-cyclohexylhydroxylamine. |
| N-amylhydroxylamine | N,N-di-isobutylhydroxylamine. |

EXAMPLE 3

Following the test procedure of Example 1 the following data were obtained:

*Table III.—Combinations of diethylhydroxylamine (DEHA) and bis(diethylhydroxylamine) oxalate (DEHA oxalate) as popcorn polymer inhibitors in the liquid phase activated seed test*

| Compound: | Result on oven heating at 140° F. |
|---|---|
| No inhibitor | Popped in 10 hours. |
| 0.05% DEHA | Popped after 7.5 days. |
| 0.10% DEHA | Popped after 14 days. |
| 0.05% DEHA oxalate | Popped after 7 days. |
| 0.10% DEHA oxalate | Popped after 8.5 days. |
| 0.01% DEHA plus 0.09% DEHA oxalate | Popped after 15 days. |
| 0.025% DEHA plus 0.075% DEHA oxalate | Popped after 15.5 days. |
| 0.05% DEHA plus 0.05% DEHA oxalate | Popped after 16 days. |
| 0.075% DEHA plus 0.025% DEHA oxalate | Popped after 22 days. |
| 0.09% DEHA plus 0.01% DEHA oxalate | Popped after 18 days. |

EXAMPLE 4

In the normal manufacture of SBR, a shortstopped latex is run through a flash tank maintained at a slight pressure (3 to 4 pounds per square inch) where most of the excess butadiene is removed and then to a vacuum flash tank, maintained at about 20 inches of mercury vacuum, where more of the butadiene is removed. In this vacuum flash tank, conditions are ideal for popcorn polymer formation, since a large amount of styrene is present with a small amount of butadiene and there are air leaks into this tank which catalyze popcorn polymer formation. When .005 part of diethylhydroxylamine per 100 parts of monomer admixed with .005 parts of diethylhydroxylamine oxalate is sprayed as a 10% by weight aqueous solution into the second tank, it is found that popcorn polymer formation usually experienced is still not in evidence after six weeks of continuous operation.

We claim:

1. The process of retarding the formation of popcorn polymers in monomer recovery systems comprising conjugated dienes, which comprises contacting said monomer with an inhibiting amount of a mixture comprising (a) compound having the structure

where $R_1$ and $R_2$ are lower alkyl and (b) the bisoxalate salts of a compound of the above structure.

2. The process of inhibiting popcorn polymer formation from monomers used in the preparation of a styrene and a butadiene co-polymer which comprises contacting said monomers with 0.001% to about 5% by weight of said monomers of a mixture comprising an N,N-di-loweralkylhydroxylamine and the bis-oxalate salt of said alkylhydroxylamine 3. The process of claim 2 wherein the inhibitor is a mixture of N,N-diethylhydroxylamine and its bis-oxalate salt.

4. The process of claim 2 wherein the inhibitor mixture is a mixture of N,N-diethylhydroxylamine and its bis-oxalate salt in a weight ratio of from 75:25 to 25:75.

5. A mixture of ethylenically unsaturated monomers wherein at least one conjugated diolefin is present containing between about 0.001% to about 5% by weight of said monomers of a mixture of an N,N-di-lower alkylhydroxylamine and its bis-oxalate salt whereby said monomers are stabilized against polymerization in the presence of a polymer seed.

6. In the process of recovering ethylenically unsaturated monomers by fractional distillation wherein at least one conjugated diolefin is present, the improvement of introducing into said distillation system an amount of a mixture of an N,N-di-lower alkylhydroxylamine and its bis-oxalate salt sufficient to inhibit popcorn polymer formation.

7. The process of claim 6 wherein about 0.001% to about 5% by weight of the monomers of the inhibitor mixture is introduced into a distillation system recovering styrene and butadiene.

References Cited

UNITED STATES PATENTS 3,148,225   9/1964   Albert _____ 260—666.5
3,265,752   8/1966   Whiton et al. _____ 260—666.5

JAMES A. SEIDLECK, *Primary Examiner.*